(12) United States Patent
Fonk et al.

(10) Patent No.: US 12,044,548 B2
(45) Date of Patent: Jul. 23, 2024

(54) TILT INDICATOR

(71) Applicant: ShockWatch, Inc., Dallas, TX (US)

(72) Inventors: Anthony N. Fonk, Austin, TX (US); Johannes A. van Niekerk, Dallas, TX (US)

(73) Assignee: Shock Watch, Inc., Dallas, TX (US)

( * ) Notice: Subject to any disclaimer, the term of this patent is extended or adjusted under 35 U.S.C. 154(b) by 375 days.

(21) Appl. No.: 17/148,999

(22) Filed: Jan. 14, 2021

(65) Prior Publication Data

US 2021/0215482 A1 Jul. 15, 2021

Related U.S. Application Data

(60) Provisional application No. 62/960,898, filed on Jan. 14, 2020.

(51) Int. Cl.
*G01C 9/06* (2006.01)
*G06K 7/10* (2006.01)

(52) U.S. Cl.
CPC ........... *G01C 9/06* (2013.01); *G06K 7/10366* (2013.01); *G01C 2009/068* (2013.01)

(58) Field of Classification Search
CPC ................ G01C 9/06; G01C 2009/068; G06K 7/10366; G06K 19/0716
See application file for complete search history.

(56) References Cited

U.S. PATENT DOCUMENTS

| | | | |
|---|---|---|---|
| 3,207,122 A | 9/1965 | Salembier | |
| 3,467,053 A | 9/1969 | Davis et al. | |
| 3,688,734 A | 9/1972 | Davis et al. | |
| 3,880,108 A | 4/1975 | Anton | |
| 3,923,000 A | 12/1975 | Cloyd | |
| 3,926,144 A | 12/1975 | Lander | |
| 4,135,472 A | 1/1979 | Chesla et al. | |
| 4,340,008 A | 7/1982 | Mendelson | |
| 4,438,720 A | 3/1984 | Conn | |
| RE32,570 E | 1/1988 | Conn | |
| 4,841,285 A | 6/1989 | Laut | |
| 4,924,799 A | 5/1990 | Rilling | |
| 4,972,595 A | 11/1990 | Shimamura et al. | |
| 4,989,334 A | 2/1991 | DuBose, Jr. | |
| 5,463,817 A | 11/1995 | Leeds | |
| 5,765,290 A | 6/1998 | Rank et al. | |

(Continued)

FOREIGN PATENT DOCUMENTS

CN 2582274 Y 10/2003
CN 201355249 12/2009
(Continued)

OTHER PUBLICATIONS

International Search Report and Written Opinion; PCT Application No. PCT/US2021/013447; May 6, 2021.
(Continued)

*Primary Examiner* — Akm Zakaria
(74) *Attorney, Agent, or Firm* — Dority & Manning, P.A.

(57) ABSTRACT

A tilt indicator includes a housing having a tilt detection assembly, switch circuitry, and a radio-frequency identification (RFID) module coupled to the switch circuitry. Responsive to the tilt detection assembly being subjected to a tilt event exceeding a threshold, the switch circuitry causes a change in a value output by the RFID module when activated.

20 Claims, 3 Drawing Sheets

(56) References Cited

U.S. PATENT DOCUMENTS

| | | | |
|---|---|---|---|
| 5,955,713 | A | 9/1999 | Titus et al. |
| 6,115,929 | A | 9/2000 | Tanazawa et al. |
| 6,341,428 | B1 | 1/2002 | Tanazawa et al. |
| 6,449,858 | B1 | 9/2002 | Reay et al. |
| 6,516,527 | B1* | 2/2003 | Moriyasu ................. G01C 9/20 |
| | | | 33/366.11 |
| 6,664,534 | B2 | 12/2003 | Hjertman et al. |
| 6,723,979 | B2 | 4/2004 | Kastura |
| 7,305,771 | B2 | 12/2007 | Lin |
| 7,318,283 | B2 | 1/2008 | Kurose et al. |
| 7,353,615 | B1 | 4/2008 | Branch |
| 7,845,086 | B2 | 12/2010 | Makimura |
| 7,926,194 | B2 | 4/2011 | Katoh et al. |
| 8,056,247 | B2 | 11/2011 | Lai |
| 8,074,366 | B2 | 12/2011 | Jiang |
| 8,181,354 | B2 | 5/2012 | Ozawa |
| 8,256,124 | B2 | 9/2012 | Su et al. |
| 8,671,582 | B2 | 3/2014 | Branch |
| 2002/0073564 | A1 | 6/2002 | Akieda |
| 2005/0248467 | A1 | 11/2005 | Igami et al. |
| 2006/0100820 | A1 | 5/2006 | Davidson |
| 2007/0152841 | A1* | 7/2007 | Eren ................. G08B 13/149 |
| | | | 340/572.1 |
| 2008/0094241 | A1* | 4/2008 | Igami ................. B65D 79/02 |
| | | | 340/689 |
| 2008/0235964 | A1 | 10/2008 | Ozawa |
| 2010/0101103 | A1 | 4/2010 | Horio et al. |
| 2010/0243413 | A1* | 9/2010 | Chu ................. H01H 35/02 |
| | | | 200/61.52 |
| 2010/0295665 | A1* | 11/2010 | Landau ................. G06Q 10/087 |
| | | | 340/10.42 |
| 2010/0315070 | A1 | 12/2010 | Hong |
| 2012/0252488 | A1 | 10/2012 | Hartmann et al. |
| 2020/0342063 | A1* | 10/2020 | Ma ................. G06F 3/017 |

FOREIGN PATENT DOCUMENTS

| | | |
|---|---|---|
| CN | 201955082 | 8/2011 |
| JP | 2011237351 A | 11/2011 |
| WO | 2008038049 | 4/2008 |
| WO | WO2018237324 A1 | 12/2018 |

OTHER PUBLICATIONS

Chinese Office Action Corresponding to Application No. 202180011069 on Jun. 25, 2023.

European Search Report Corresponding to EP21741380 on Jan. 19, 2024.

European Search Report Corresponding to EP21741380 on Mar. 21, 2024.

Anonymous, TiltAction Single Angle Tilt Indicators, XP093139031, 2017. Retrieved from Internet: https://shockaction.com/uploads/file/62dS27cdb5d4f.pdf.

Anonymous, TiltAction Plus Tilt Indicators, XP093139285, 2019. Retrieved from Internet: https://shockaction.com/product/tiltaction-plus-32.html

* cited by examiner

TILT INDICATOR

BACKGROUND

During manufacturing, storage, transit, or usage, many types of objects need to be monitored or tracked due to the tilt sensitivity or fragility of the objects. For example, in today's global economy, goods, materials, manufactured articles, and the like are often transported great distances before reaching their final destination. The shipping process may involve multiple transportation methods. For instance, it is not uncommon for a product manufactured in Asia, to be loaded on a truck, transported to a rail station, loaded onto a railcar, transported by rail to a port, loaded onto a cargo ship, transported overseas to a port, loaded onto a truck, transported over road by truck, and delivered to a warehouse. Once at the warehouse, the product may again be shipped via air or ground before reaching the ultimate user of the product. During this process, the product may be loaded and unloaded many times and may be occasionally damaged as a result of handling mishaps. Some products are susceptible to damage if they are not transported in a certain position. For example, some computer hard drives are known to malfunction if they are turned on their sides or upside down. Thus, some types of objects may be susceptible to damage if upended, turned over, or tilted at greater than a predetermined angle. Thus, for quality control purposes and/or the general monitoring of transportation conditions, it is desirable to determine and/or verify the environmental conditions an object has experienced.

BRIEF SUMMARY

According to one aspect of the present disclosure, a tilt indicator includes a housing having a tilt detection assembly, switch circuitry, and a radio-frequency identification (RFID) module coupled to the switch circuitry. Responsive to the tilt detection assembly being subjected to a tilt event exceeding a threshold, the switch circuitry causes a change in a value output by the RFID module when activated.

According to another embodiment of the present disclosure, a tilt indicator includes a housing having a tilt detection assembly, a communication module, and switch circuitry conductively connected to a mass member of the tilt detection assembly. Responsive to the tilt indicator being subjected to a tilt event exceeding a threshold, the mass member disconnects from the switch circuitry, and wherein the communication module is configured to indicate an activated state of the tilt indicator in response to the disconnection.

According to yet another embodiment of the present disclosure, a tilt indicator includes a housing having a tilt detection assembly, an arming element configured to maintain the tilt detection assembly in an unarmed state, switch circuitry, and a radio-frequency identification (RFID) module coupled to the switch circuitry. Removal of the arming element from the tilt indicator places the tilt detection assembly in an armed state. Responsive to the tilt detection assembly being subjected to a tilt event exceeding a threshold after being in the armed state, the switch circuitry causes a change in a value output by the RFID module when activated.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a device and technique for tilt detection and indication. According to one embodiment, a tilt indicator includes a tilt indicator includes a housing having a tilt detection assembly, switch circuitry, and a radio-frequency identification (RFID) module coupled to the switch circuitry. Responsive to the tilt detection assembly being subjected to a tilt event exceeding a threshold, the switch circuitry causes a change in a value output by the RFID module when activated. Embodiments of the present disclosure enable tilt event detection using no internal power supply. For example, a tilt-sensing assembly or mechanism closes or opens switch circuitry in response to detecting a particular tilt event. The RFID module can detect the state of the switch circuitry and emits or outputs a particular value based on whether the switch circuitry is in a closed circuit or open circuit condition. Thus, for example, an RFID reader can be used to activate the RFID module and determine an activation status of the tilt indicator device. Embodiments of the present disclosure provide a tilt indicator that is readily affixable to a container, an item or the like so as to provide at least an indication when a particular container or component has been subjected to a particular environmental tilt. Embodiments of the present disclosure also provide a tilt indicator that is an irreversible, "go-no go" device for indicating that a predetermined tilt has been experienced by the indicator.

Figure 1:
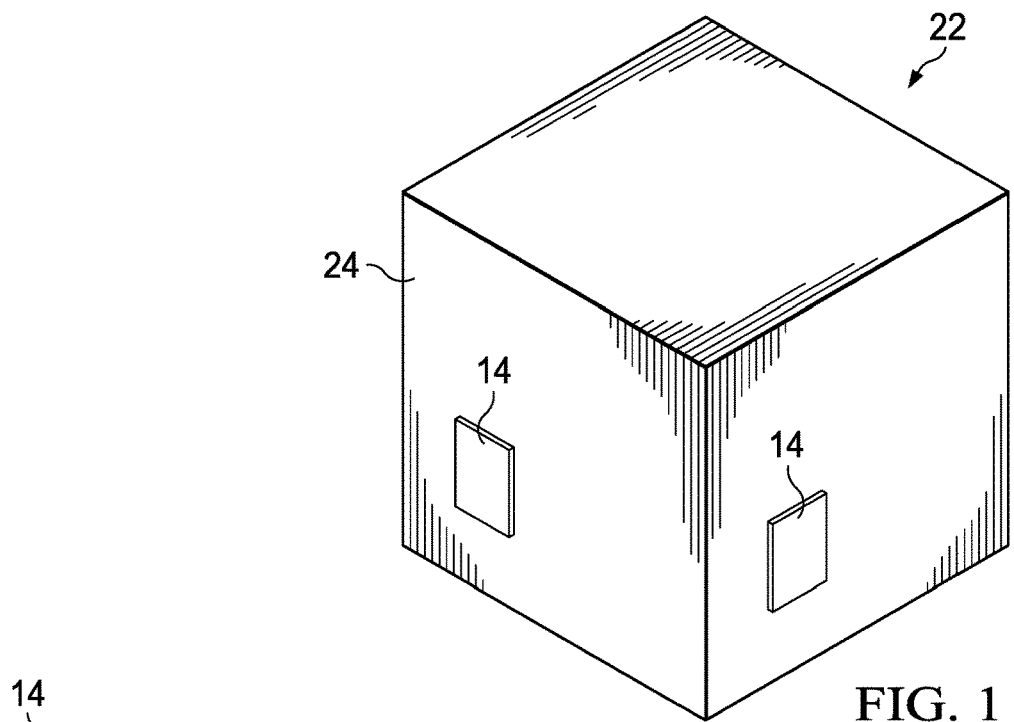
FIG. 1 is a diagram illustrating an application of an embodiment of a tilt indicator according to the present disclosure.

With reference now to the Figures and in particular with reference to FIG. 1, exemplary diagrams of a tilt indicator are provided. Referring to FIG. 1, an object, such as a shipping package 22, has one or more tilt indicators 14 affixed on one or more walls 24 thereof for determining whether the package has been maintained in its recommended orientation during shipment and not tilted beyond a predetermined maximum angle. The shipping package 22 may be of any of the conventional form, such as crates, pallets, boxes, cartons, barrels, drums, cans, bottles or other containers emplaced about the goods before shipping. Alternatively, tilt indicator(s) 14 could be placed directly onto the goods themselves. Thus, an object bearing tilt indicator 14 could be goods, a container bearing goods, etc. In order to detect unauthorized tilting, tilt indicator 14 is preferably placed on an upright or side wall 24 of the shipping package 22 when in the upright position. In some embodiments, tilt indicator 14 is sensitive in two dimensions, namely in the plane of indicator 14 (e.g., a plane corresponding to wall 24). Thus, tilt indicator 14 may be used in combination with another tilt indicator 14 placed on an adjacent side wall 24 of the package 20 wherein the two tilt indicators 14 are transverse to one another.

Figure 2:
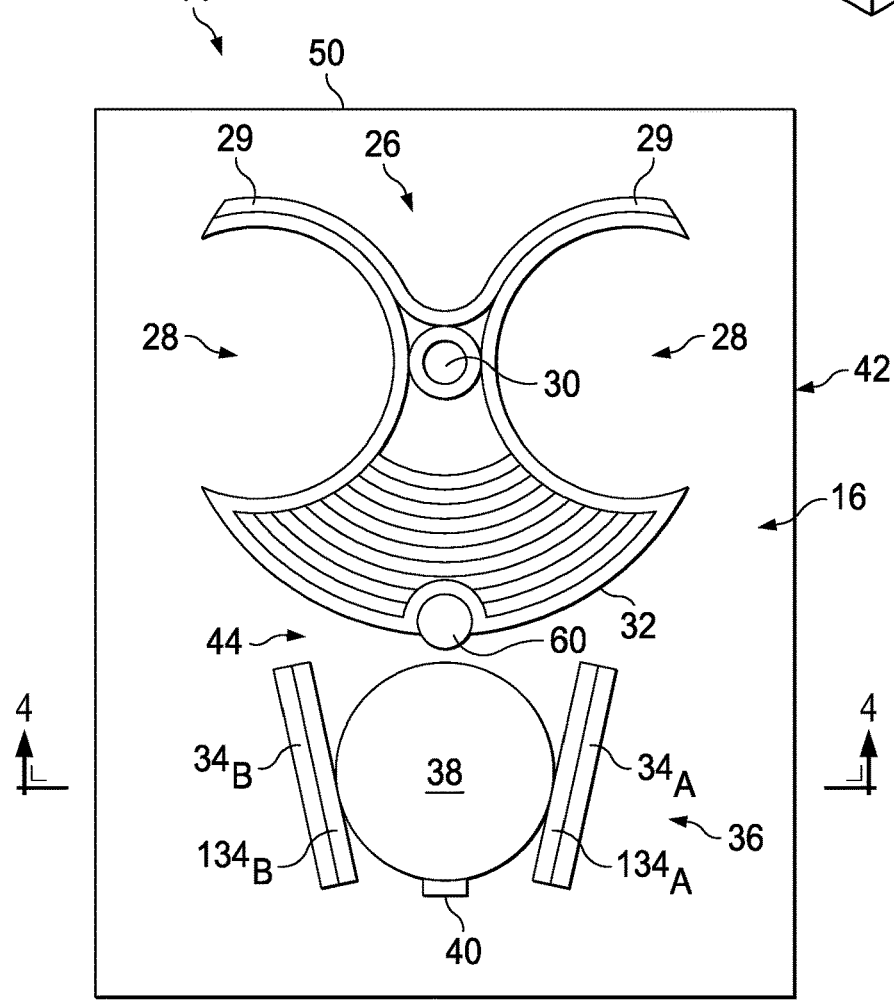
FIG. 2 is a diagram illustrating an embodiment of a tilt indicator in accordance with the present disclosure in an unactivated state.

FIG. 2 is a diagram illustrating an embodiment of tilt indicator 14 in accordance with the present disclosure in an unactivated state. The mechanical operation of tilt indicator 14 is similar to the commercially available tilt indicator Tilt Watch XTR available from SpotSee of Dallas, Texas, and also described more fully in U.S. Pat. No. 7,353,615 which is incorporated, in its entirety, herein by reference.

In FIG. 2, tilt indicator 14 has a container or housing 42 supporting a tilt detection assembly 16 including a receptacle 36 adjacent to a base plate or support member 50 that has a closed end 40, an open end 44, and sides $34_A$ and $34_B$ that extend between the closed end 40 and open end 44. Sides $34_A$ and $34_B$ are formed having respective conductive contact areas or surfaces $134_A$ and $134_B$ that face a disc or mass 38 of tilt detection assembly 16. Surfaces $134_A$ and $134_B$ may be variously configured (e.g., as separate conductive elements affixed to respective sides $34_A$ and $34_B$, a conductive coating applied to respective sides $34_A$ and $34_B$, etc.). Mass 38 is also configured as a conductive element so that mass 38 forms a conductive path between conductive surfaces $134_A$ and $134_B$. Mass 38 may also be variously configured (e.g., formed entirely from a conductive material, having a conductive coating applied to a non-conductive underlying material, etc.). Receptacle 36, which may also be referred to as a retaining receptacle, receives mass 38 therein. In some embodiments, mass 38 is a disc because tilt indicator 14 is configured having a thin profile.

In the illustrated embodiment, receptacle 36 is configured in the form of a V-shape or flared horseshoe shape with closed end 40 of the V or horseshoe located near the base of tilt indicator 14. Open end 44 is located above closed end 40 when indicator 14 is in the upright, or vertical, position. Sides $34_A$ and $34_B$ of the V or horseshoe extend from closed end 40 of receptacle 36 at angles relative to one another so as to allow mass 38 to rest within the cavity formed by sides $34_A$ and $34_B$ and to escape receptacle 36 when tilt indicator 14 is inclined beyond a predetermined angle. In the normal, upright orientation of tilt indicator 14, mass 38 is located inside of receptacle 36 and is in contact with surfaces $134_A$ and $134_B$ to thereby form a conductive path between surfaces $134_A$ and $134_B$. When receptacle 36 is tilted beyond a predetermined angle, mass 38 exits receptacle 36 and the conductive path between surface $34_A$ and $34_B$ is broken. In some embodiment, this angle is generally the angle at which one of sides $34_A$ or $34_B$ is oriented at or below horizontal. For example, when indicator 14 is tilted to say, 80 degrees from its upright orientation, then mass 38 can exit receptacle 36. The slope or angle of the sides $34_A$ and $34_B$ determines the angle at which indicator 14 will become activated. Accordingly, the slope or angle of the sides $34_A$ and $34_B$ may be varied to a desired angle of indicator 14 activation. Further, in the illustrated embodiment, indicator 14 is bi-directional and is activated by tilting indicator 14 beyond the predetermined angle towards either of sides $34_A$ or $34_B$ of receptacle 36.

Receptacle 36 is located within housing 42 and, in some embodiments, housing 42 is configured having a thin profile. Accordingly, in this embodiment, mass 38 can only move in two dimensions, for practical purposes (there may be some minimal movement in a third dimension (e.g., between support member 50 and the face of housing 42 (note expressly shown in FIG. 2).

Occasionally, mass 38 will move in response to vibrational frequencies to which mass 38 is sensitive or responsive. This movement could in some cases cause mass 38 to escape from receptacle 36 even in the absence of receptacle 36 tilting, resulting in a false indication of tilting. In order to prevent such a false indication under this set of vibrational frequencies, tilt detection assembly 16 is configured such that the exit of receptacle 36 by mass 38 is blocked by a hanging mass 26 of tilt detection assembly 16. Hanging mass 26 is suspended adjacent to open end 44 and has a pivot point 30 around which hanging mass 26 pivots in a plane parallel with member 50 and/or mass 38. When receptacle 36 is in its normal, untilted or unactivated orientation, hanging mass 26 blocks the exit of mass 38 from receptacle 36. Thus, even if vibration moves mass 38 toward open end 44, tilt indicator 14 does not activate. Hanging mass 26 is generally not sensitive or responsive to the same vibrational frequencies as mass 38. Instead, hanging mass 26 is responsive to a second, different set of vibrational frequencies. Hanging mass 26, while preventing false activation, does not interfere with normal operation of indicator 14. When receptacle 36 is tilted beyond the predetermined angle, hanging mass 26 moves so as to allow mass 38 to exit receptacle 36. A tilting indication or activation occurs when mass 38 has exited receptacle 36.

Hanging mass 26 has at least two lateral wings 29 or arms located above a blocking portion 32 of mass 26, as shown in FIG. 2. Wings 29 are located on the opposite side of pivot point 30 from the blocking portion 32 and form lateral cavities 28 at least slightly larger than the diameter of mass 38. Although the illustrated embodiment has lateral cavities 28, tilt indicator 14 without lateral cavities 28 will prevent the escape of mass 38 in the presence of vibrational frequencies to which mass 38 is sensitive.

Once mass 38 exits receptacle 36 and enters the exposed lateral cavity 28 of hanging mass 26, the weight of mass 38 within the lateral cavity 28 will further cause hanging mass 26 to pivot. Mass 38 will then fall from the lateral cavity 28 into the non-receptacle part of the housing 42. Once the shipping package 22 is re-oriented to the upright position, hanging mass 26 returns to the blocking position depicted in FIG. 2 and mass 38 remains outside the retaining receptacle 36.

Thus, hanging mass 26 acts as a pendulum, maintaining its orientation due to gravity. When receptacle 36 is upright, hanging mass 26 blocks open end 44 of receptacle 36. When tilt indicator 14 is tilted, hanging mass 26 moves and no longer blocks open end 44. Wings 29 of hanging mass 26 prevent reentry of mass 38 upon escape of mass 38 from receptacle 36.

In order to make tilt indicator 14 field armable so that tilt indicator 14 is prevented from being activated until ready, a removable retaining device such as an arming pin 60 is provided, as shown in FIG. 2. Arming pin 60 prevents mass 38 from escaping receptacle 36 and remains in place until such time as pin 60 is removed and indicator 14 is placed into service.

Figure 3:
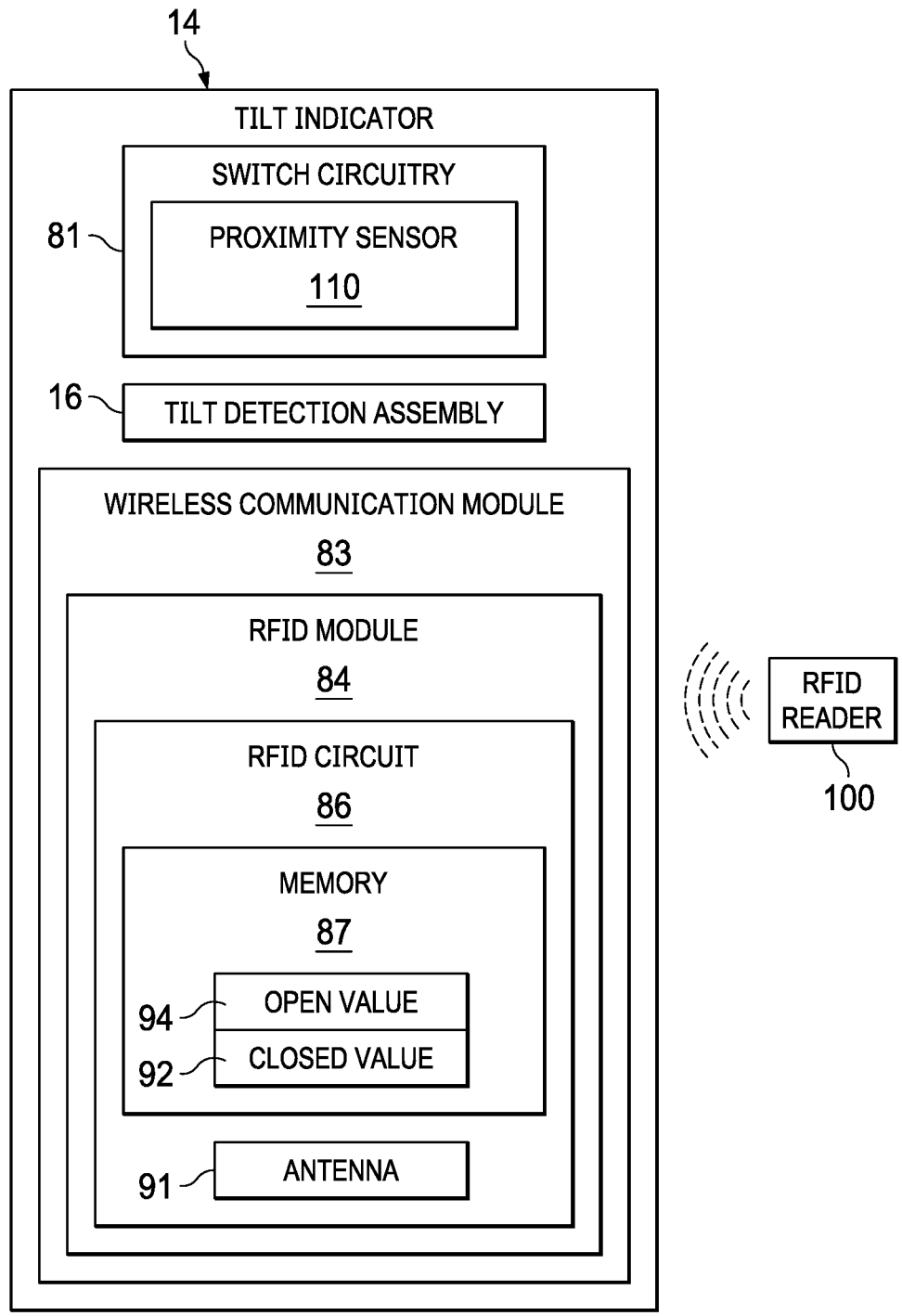
FIG. 3 is a block diagram illustrating an embodiment of the tilt indicator of FIGS. 1 and 2 according to the present disclosure.

FIG. 3 is a block diagram representing and illustrating an embodiment of indicator 14 in accordance with an embodiment of the present disclosure. In some embodiments, tilt indicator 14 may be affixed (permanently or removably) to a printed circuit board and/or otherwise permanently or removably connected to electronic circuitry (e.g., such as a removable cartridge) such that, in response to receipt and/or detection of a tilt condition of a sufficient magnitude and/or exceeding a particular threshold(s), tilt indicator 14 provides an electronic switch closure or opener that may thereby provide an electronic signal/indication of such event.

In FIG. 3, indicator 14 includes switch circuitry 81, a wireless communication module 83 coupled to switch circuitry 81, and tilt detection assembly 16 coupled to switch circuitry 81. Tilt detection assembly 16 may cause a state change in switch circuitry 81 (e.g., changing from an open circuit condition to a closed circuit condition, or vice versa).

Switch circuitry 81 may comprise one or more switch elements, contacts, and or circuits that are responsive to a tilt event as detected by tilt detection assembly 16. Wireless communication module 83 is configured to wirelessly communicate information associated with a state of switch circuitry 81 indicating the activation state of indicator 14 (e.g., based on an open or closed circuit state of circuitry 81). For example, in one embodiment, wireless communication module 83 includes an RFID module 84. In some embodiments, RFID module 84 comprises a passive RFID module 84 (e.g., a passive RFID tag) having an RFID integrated circuit or circuitry 86 (e.g., disposed on or as part of a printed circuit board) and a memory 87, along with an antenna 91. As a passive RFID module 84, indicator 14 does not contain a battery (e.g., power is supplied by an RFID reader 100). For example, when radio waves from reader 100 are encountered by module 84, antenna 91 forms a magnetic field, thereby providing power to module 84 to energize circuit 86. Once energized/activated, module 84 may output/transmit information encoded in memory 87. However, it should be understood that, in some embodiments, RFID module 84 may comprise an active RFID module 84 including a power source (e.g., a battery) that may be configured to continuously, intermittently, and/or according to programmed or event triggers, broadcast or transmit certain information. It should also be understood that wireless communication module 83 may be configured for other types of wireless communication types, modes, protocols, and/or formats (e.g., short-message services (SMS), wireless data using General Packet Radio Service (GPRS)/3G/4G or through public internet via Wi-Fi, or locally with other radio-communication protocol standards such as Wi-Fi, Z-Wave, ZigBee, Bluetooth®, Bluetooth® low energy (BLE), LoRA, NB-IoT, SigFox, Digital Enhanced Cordless Telecommunications (DECT), or other prevalent technologies). As will be described further below, tilt indicator 14 functions as a tilt fuse such that, in response to encountering a particular tilt event (e.g., some tilt exceeding some angular threshold), an electrically conductive member either opens or closes an electronic switch (e.g., of switch circuitry 81). This configuration enables tilt indicator 14 to be used as a passive tilt sensor/indicator that can be used as part of an electronic signal or circuit. In some embodiments, the tilt sensing capabilities/functions of tilt indicator 14 of the present disclosure needs no power while in the monitoring state. When activated, tilt indicator 14 completes or opens an electrical path of a circuit and thus could be integrated into most any electronic monitoring system.

In the illustrated embodiment, memory 87 includes at least two different stored and/or encoded values 92 and 94. For example, value 92 may correspond to a value outputted/transmitted by module 84 when switch circuitry 81 is in an open circuit condition or state, and value 94 may correspond to a value outputted/transmitted by module 84 when switch circuitry 81 is in a closed circuit condition or state. As an example, the value 94 may represent an RFID tag identification (ID) number not having an activated tilt switch circuitry 81, and the RFID tag's ID number may have an additional character (e.g., "0") placed at the end thereof. Value 92 may represent the RFID ID number having an activated tilt switch circuitry 81, and the RFID tag's ID number may have an additional character at the end thereof being different from the additional character carried by value 94 (e.g., "1"). In the illustrated embodiment, RFID module 84 (e.g., circuitry 86) is coupled to switch circuitry 81 and can detect whether switch circuitry 81 is in an open or closed circuit condition or state. Thus, for example, switch circuitry 81 may initially be in a closed circuit condition or state. Thus, if energized/activated, module 84 would transmit value 92 to reader 100. If indicator 14 were to be subject to a tilt event (e.g., an environmental tilt exceeding some threshold), tilt detection assembly 16 may cause a change in circuitry 81 that would result in circuitry 81 being in an open circuit condition or state. Thus, if now energized/activated (e.g., after the tilt event), module 84 would instead transmit value 94 to reader 100. Thus, embodiments of the present invention enable indicator 14 to monitor sensitive products/objects to which it is attached for potential damage caused by tilt conditions using electronic indicators (e.g., RFID readers) while indicator 14 does not contain or require any internal power source (e.g., a battery).

The present invention may include computer program instructions at any possible technical detail level of integration (e.g., stored in a computer readable storage medium (or media) (e.g., memory 87) for causing a processor to carry out aspects of the present invention. Computer readable program instructions described herein can be downloaded to respective computing/processing devices (e.g., communication module 83 and/or RFID module 84). Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. In some embodiments, electronic circuitry (e.g., circuitry 86) including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to illustrations and/or block diagrams of methods and/or apparatus according to embodiments of the invention. It will be understood that each block of the illustrations and/or block diagrams, and combinations of blocks in the illustrations and/or block diagrams, may represent a module, segment, or portion of code, can be implemented by computer readable program instructions. These computer readable program instructions may be provided to a processor or other programmable data processing apparatus to produce a machine, such that the instructions, which execute via the processor, create means for implementing the functions/acts specified in the illustrations and/or block diagram block or blocks. These computer readable program instructions may also be stored in a computer readable storage medium that can direct a computing device, a programmable data processing apparatus, and/or other devices to function in a particular manner, such that the computer readable storage medium having instructions stored therein comprises an article of manufacture including instructions which implement aspects of the function/act specified in the illustrations and/or block diagram block or blocks. Switch circuitry 81, wireless communication module 83, and/or RFID module 84 may be implemented in any suitable manner using known techniques that may be hardware-based, software-based, or some combination of both. For example, switch circuitry 81, wireless communication module 83, and/or RFID module 84 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). As will be appreciated by one skilled in the art, aspects of the present disclosure may be embodied as a system, method or computer program product. Accordingly, aspects of the present disclosure may take the form of a hardware embodiment, a software embodiment (including firmware, resident software, microcode, etc.) or an embodiment combining software and hardware aspects that may all generally be referred to herein as a "circuit," "module" or "system."

Figure 4:
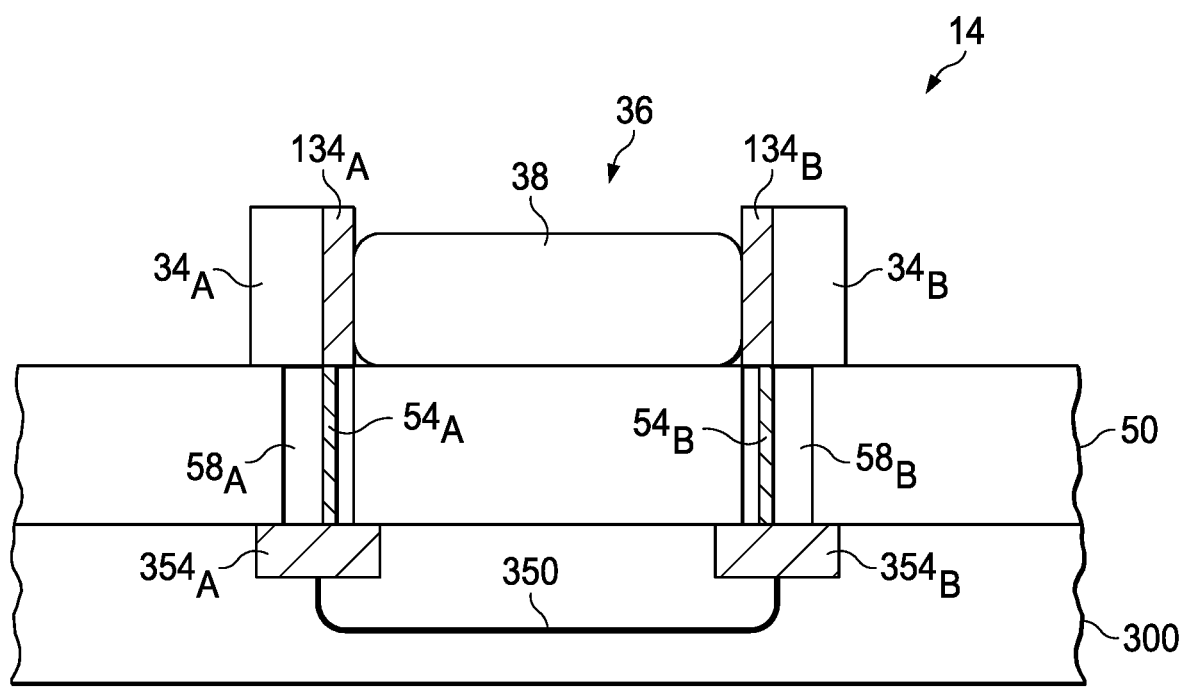
FIG. 4 is a diagram illustrating a section view of a portion of the tilt indicator of FIG. 2 along the line 4-4 of FIG. 2.

FIG. 4 is a diagram illustrating a section view of a portion of the tilt indicator 14 of FIG. 2 along the line 4-4 of FIG. 2. In FIG. 4, tilt indicator 14 functions as a tilt fuse such that, in response to indicator 14 being tilted beyond a predetermined angle, mass 38 opens an electronic switch. This configuration enables tilt indicator 14 to be used as a passive tilt sensor that can be used as part of an electronic signal or circuit. The tilt sensing capabilities/functions of the tilt switch of the present disclosure needs no power while in the monitoring state. When activated, the tilt switch can be used to complete or open an electrical path of a circuit and thus could be integrated into most any electronic monitoring system. Thus, the tilt switch of the present disclosure provides an easily assembled and a low cost passive tilt-sensing device.

In FIG. 4, tilt indicator 14 includes an electronic assembly 300. Electronic assembly 300 may include and/or be coupled to one or more elements of switch circuitry 81 and/or communication module 83. In the illustrated embodiment, switch circuitry 81 includes conductive surfaces $134_A$ and $134_B$ electrically connected to conductors $54_A$ and $54_B$, respectively, that extend through member 50 through conduits $58_A$ and $58_B$ to electrical contacts $354_A$ and $354_B$, respectively, on electronic assembly 300. Conduits may $58_A$ and $58_B$ may be vias formed in member 50 or may be otherwise configured. In some embodiments, conduits $58_A$ and $58_B$ may be conductive vias that incorporate therein conductors $54_A$ and $54_B$, respectively. Switch circuitry 81 also includes a conductive element 350 (e.g., a wire or other type of conductive component, such as a trace) extending between contacts $354_A$ and $354_B$. In FIG. 4, in an unactivated state of tilt indicator 14 when mass 38 is in receptacle 36, mass 38 is configured to simultaneous contact conductive surfaces $134_A$ and $134_B$. Thus, in an unactivated state of indicator 14, switch circuitry 81 is in a closed circuit state based on the conduction continuity of mass 38, conductive surfaces $134_A$ and $134_B$, electrical contacts $354_A$ and $354_B$, and element 350. RFID module 84 is coupled to switch circuitry 81 and/or electronic assembly 300 to detect the open or closed circuit state of switch circuitry 81.

Thus, in operation, in an unactivated state of indicator 14, mass 38 creates a closed circuit state of switch circuitry 81 based on mass 38 being conductively coupled to or in contact with surfaces $134_A$ and $134_B$. Accordingly, when read by reader 100, for example, RFID module 84 would output value 92. Responsive to a tilt event that causes mass 38 to be displaced from receptacle 36 (not expressly shown in FIG. 4 but described in detail above), switch circuitry 81 changes from a closed circuit state to an open circuit state because the conductive surface of mass 38 no longer bridges the gap between conductive surfaces $134_A$ and $134_B$. In the activated state of indicator 14, RFID module would detect the open circuit state of switch circuitry 81 and output value 94 when read by reader 100. In at least one embodiment, electronic system 300 includes RFID module 84 configured as a passive RFID tag. A passive RFID tag may be desirable because it does not contain an internal power source or battery. The power is supplied by the reader of the RFID tag (e.g., RFID reader 100). When radio waves from reader 100 are encountered by a passive RFID tag, the coiled antenna within the tag forms a magnetic field. The tag draws power from it, energizing the circuits in the tag. The tag then sends the information encoded in the tag's memory. Passive RFID tags have a number of advantages including that the tag functions without a battery and have therefore can have a useful life of twenty years or more. The tag is typically much less expensive to manufacture and it can be very, very small when compared to other electronic assemblies requiring a battery or other power source.

Passive RFID tags typically have an identifying number stored within the tag. When the tag is queried it draws power from the RF signal that is querying it. This technique, called backscatter, harvests power from the RF signal that in turn drives the local electronics of the RFID tag.

Tilt indicator 14 described herein can be electrically connected to an input of the tag's electronics. In the embodiment shown in FIG. 4, in an unactivated state (i.e., no tilt event) of the tilt switch, this input would be in a closed state (i.e., the conductive surface of mass 38 is in contact or connection with surfaces $134_A$ and $134_B$ and has created a closed circuit condition with surfaces $134_A$ and $134_B$). If the RFID tag is queried when tilt indicator 14 has not been subject to a sufficient tilt to displace mass 38 from receptacle 36, the RFID tag electronics would detect this input in said state, which is the unactivated, closed circuit state from a tilt environment perspective.

Alternatively, if tilt indicator 14 were activated (i.e., indicator 14 had encountered a tilt event great enough to dislodge mass 38 from receptacle 36), the RFID tag electronics would then change to an open resistance or circuit state. If the RFID tag were queried while the tilt switch was in this open state, the RFID tag would read or detect this input as being in a different state then the closed state described above.

In yet another embodiment of the present disclosure, the change in state is not the opening or closing of an electrical switch but instead the movement of mass 38 causing a change in an inductive proximity sensor (or capacitive proximity sensor) of switch circuitry 81. For example, in some embodiments, switch circuitry may include an inductive or capacitive proximity sensor 110 (see FIG. 3). Inductive and capacitive proximity sensors or switches belong to a category of non-contact electronic proximity sensors. These non-contact sensors can be used for positioning and detection of metal objects. In these embodiments, mass 38 is a metal object (or has a metal surface) that can be sensed but is not necessarily in direct contact with the electrical assembly associated with the passive RFID module 84. Sensor 110 may be configured as part of electronic assembly 300 and located and/or positioned to detect the exiting of mass 38 from receptacle 36. For example, in response to sensor 110 detecting the exiting of mass 38 from receptacle 36, the state of sensor 110 may be detected by RFID module 84 such that a value output or emitted by RFID module 84 changes to indicate an activated status of indicator 14.

As described above, in at least one embodiment, the RFID tag or RFD module 84 may carry two (2) identifying numbers. As an example, the first number, would represent the tag not having an activated tilt switch, and the RFID tag's ID number would have an additional character (e.g. "0") placed at the end. The second RFID tag number, which would represent the tag having an activated tilt switch would be the tag's ID number with the additional character at the end being different from the additional character carried by the first number. For example, for the second number this additional character could be, for example, the number one (e.g., "1").

When the RFID tag is queried, it would power up, check the condition of the tilt switch input, and then select the appropriate stored number to send. Once this number is sent, the receiving software could then parse the number and make the determination to whether the tilt switch has been activated.

Using this system and method described herein, it is possible to very simply and clearly determine whether the tilt switch has been activated (i.e. the shipment or product has been subject to tilt) because the number being returned by the RFID tag when it is interrogated is different depending upon the status of tilt indicator 14.

Thus, embodiments of the present disclosure enable tilt event detection using a tilt indicator having a small footprint using a tilt-sensitive assembly with a passive RFID tag that gives a different reading depending upon the status of the tilt switch circuitry. Because the RFID tag is passive, the tilt indicator does not need a battery or other external power source. Further, the configuration of the tilt indictor enables the tilt indicator to be irreversible once activated. Additionally, the tilt indicator of the present disclosure may be configured to be coupled with or in addition to a visual indicator to provide a redundant or additional visual indication of activation.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A tilt indicator, comprising:
a housing having a tilt detection assembly;
switch circuitry; and
a radio-frequency identification (RFID) module coupled to the switch circuitry and configured to output a first value in an unactivated state of the tilt indicator and a second value in an activated state of the tilt indicator; and
wherein responsive to the tilt detection assembly being subjected to a tilt event exceeding a threshold, the switch circuitry causes the second value to be output by the RFID module when energized.

2. The tilt indicator of claim 1, wherein the tilt detection assembly includes a receptacle containing a mass member, and wherein response to the tilt detection assembly being subjected to the tilt event exceeding the threshold, the mass member exits the receptacle to thereby cause the second value to be output by the RFID module.

3. The tilt indicator of claim 1, wherein the switch circuitry includes a plurality of conductive surfaces formed on a receptacle, and wherein the receptacle is configured to support a conductive mass member therein, and wherein the conductive mass member is configured to contact the plurality of conductive surfaces in the unactivated state of the tilt indicator.

4. The tilt indicator of claim 1, wherein the switch circuitry is configured to be in a state of either a closed circuit or an open circuit, and responsive to the tilt detection assembly being subjected to the tilt event exceeding the threshold, a change to the state occurs.

5. The tilt indicator of claim 1, wherein the RFID module includes a passive RFID module.

6. The tilt indicator of claim 1, wherein the switch circuitry includes:
first and second conductive surfaces formed on a receptacle, and wherein the receptacle is configured to support a conductive mass member therein; and
first and second conductors extending through a support member of the housing and electrically connected to the respective first and second conductive surfaces; and
wherein the RFID module is coupled to the first and second conductors.

7. The tilt indicator of claim 6, wherein the conductive mass member is configured to conductively connect the first conductive surface with the second conductive surface in the unactivated state of the tilt indicator.

8. A tilt indicator, comprising:
a housing having a tilt detection assembly;
a communication module; and
switch circuitry conductively connected to a mass member of the tilt detection assembly when the tilt indicator is in an upright position, and wherein responsive to the tilt indicator being subjected to a tilt event exceeding a threshold, the mass member moves from a first position to a second position and disconnects from the switch circuitry, and wherein the communication module is configured to indicate an activated state of the tilt indicator in response to the disconnection, and wherein the tilt detection assembly is configured to prevent the mass member from returning to the first position in response to the tilt indicator returning to the upright position.

9. The tilt indicator of claim 8, wherein the communication module includes a passive radio-frequency identification (RFID) module.

10. The tilt indicator of claim 8, wherein the mass member comprises a conductive mass member.

11. The tilt indicator of claim 8, wherein the tilt detection assembly includes a receptacle configured to support the mass member in an unactivated state of the tilt detection assembly, and wherein responsive to the tilt indicator being subjected to the tilt event exceeding the threshold, the mass member exits the receptacle and disconnects from the switch circuitry.

12. The tilt indicator of claim 8, wherein the switch circuitry is configured to change from a closed circuit to an open circuit in response to the tilt indicator being subjected to the tilt event exceeding the threshold.

13. A tilt indicator, comprising:
a housing having a tilt detection assembly;
an arming element configured to maintain the tilt detection assembly in an unarmed state;
switch circuitry; and
a radio-frequency identification (RFID) module coupled to the switch circuitry and configured to output a first value in an unactivated state of the tilt indicator and a second value in an activated state of the tilt indicator; and
wherein removal of the arming element from the tilt indicator places the tilt detection assembly in an armed state, and wherein responsive to the tilt detection assembly being subjected to a tilt event exceeding a threshold after being in the armed state, the switch circuitry causes a change from the first value being output by the RFID module when energized to the second value being output by the RFID module when energized.

14. The tilt indicator of claim 13, wherein the switch circuitry includes a plurality of spaced apart conductive elements, and wherein the tilt detection assembly includes a conductive mass member configured to conductively connect the conductive elements in the unactivated state of the tilt detection assembly.

15. The tilt indicator of claim 14, wherein responsive to the tilt detection assembly being subjected to the tilt event exceeding the threshold, the mass member moves to a position to conductively disconnect the conductive elements from each other.

16. The tilt indicator of claim 13, wherein the tilt detection assembly includes:

a receptacle formed by a plurality of spaced apart side elements; and
a mass member disposed within the receptacle in the unactivated state of the tilt detection assembly; and
wherein the switch circuitry includes a conductive portion formed on each of the side elements, and wherein the mass member is configured to conductively connect the respective portions, and wherein responsive to the tilt detection assembly being subjected to the tilt exceeding the threshold, the mass member leaves the receptacle and conductively disconnects the portions from each other.

17. The tilt indicator of claim 16, wherein the switch circuitry includes a proximity sensor.

18. The tilt indicator of claim 13, wherein the RFID module comprises a passive RFID module.

19. The tilt indicator of claim 13, wherein the switch circuitry is configured to be in a state of either a closed circuit or an open circuit, and responsive to the tilt detection assembly being subjected to the tilt event exceeding the threshold, a change to the state occurs.

20. The tilt indicator of claim 13, wherein the switch circuitry includes:
first and second conductive surfaces formed on a receptacle, and wherein the receptacle is configured to support a conductive mass member therein; and
first and second conductors extending through a support member of the housing and electrically connected to the respective first and second conductive surfaces; and
wherein the RFID module is coupled to the first and second conductors.

* * * * *